(12) United States Patent
Xu et al.

(10) Patent No.: US 7,239,775 B2
(45) Date of Patent: Jul. 3, 2007

(54) HIGH REPETITION RATE, LINEAR, TRUE TIME OPTICAL DELAY LINE

(75) Inventors: Jingzhou Xu, Troy, NY (US); Xi-Cheng Zhang, Melrose, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 10/537,626

(22) PCT Filed: Mar. 8, 2005

(86) PCT No.: PCT/US2005/007500

§ 371 (c)(1),
(2), (4) Date: Sep. 7, 2006

(87) PCT Pub. No.: WO2005/088371

PCT Pub. Date: Sep. 22, 2005

(65) Prior Publication Data

US 2007/0009207 A1 Jan. 11, 2007

Related U.S. Application Data

(60) Provisional application No. 60/551,459, filed on Mar. 9, 2004, provisional application No. 60/567,991, filed on May 4, 2004, provisional application No. 60/606,071, filed on Aug. 31, 2004.

(51) Int. Cl.
*G02B 6/26* (2006.01)
*G02B 5/10* (2006.01)
*H04J 14/00* (2006.01)

(52) U.S. Cl. .............................. 385/25; 385/31; 385/15; 385/39; 385/146; 398/53; 359/868; 359/872; 359/869; 359/863

(58) Field of Classification Search .................. 385/14, 385/15, 16, 17, 25, 24, 31, 129, 130, 146, 385/39; 359/868, 872, 869, 863; 398/53
See application file for complete search history.

(56) References Cited

U.S. PATENT DOCUMENTS 3,437,954 A * 4/1969 Herriott et al. ............. 359/346

(Continued)

OTHER PUBLICATIONS

International Search Report for PCT International Application No. PCT/US05/07500 mailed Aug. 24, 2005.

*Primary Examiner*—Brian M. Healy
(74) *Attorney, Agent, or Firm*—RatnerPrestia

(57) ABSTRACT

An optical delay line for use with an optical source including input/output optics optically coupled to the optical source and a curved mirror with a reflective surface that is centered about an evolute curve of the delay line to retro-reflect light traveling along a delay line beam path tangent to the edge of the evolute curve. The input/output optics direct light from the optical source along the delay line beam path and direct delayed light from the delay line beam path out of the optical delay line along an output beam path. The input/output optics and/or the curved mirror rotate about the evolute curve at a selected angular speed. The reflective surface has a curvature based on a parametric curve that is calculated from the evolute curve such that the delay of the delay line varies according to a predetermined function as the input/output optics and/or the curved mirror rotate.

28 Claims, 7 Drawing Sheets

U.S. PATENT DOCUMENTS

| | | | |
|---|---|---|---|
| 4,830,479 A | 5/1989 | Lammers et al. | 350/486 |
| 5,007,721 A | 4/1991 | Morris et al. | 350/486 |
| 5,066,088 A * | 11/1991 | Davies et al. | 385/25 |
| 5,109,446 A * | 4/1992 | Kaltschmidt | 385/24 |
| 5,264,971 A | 11/1993 | Lammers et al. | 360/63 |
| 5,852,687 A * | 12/1998 | Wickham | 385/14 |
| 7,043,108 B1 * | 5/2006 | Olsen | 385/14 |
| 2007/0009207 A1 * | 1/2007 | Xu et al. | 385/39 |

* cited by examiner

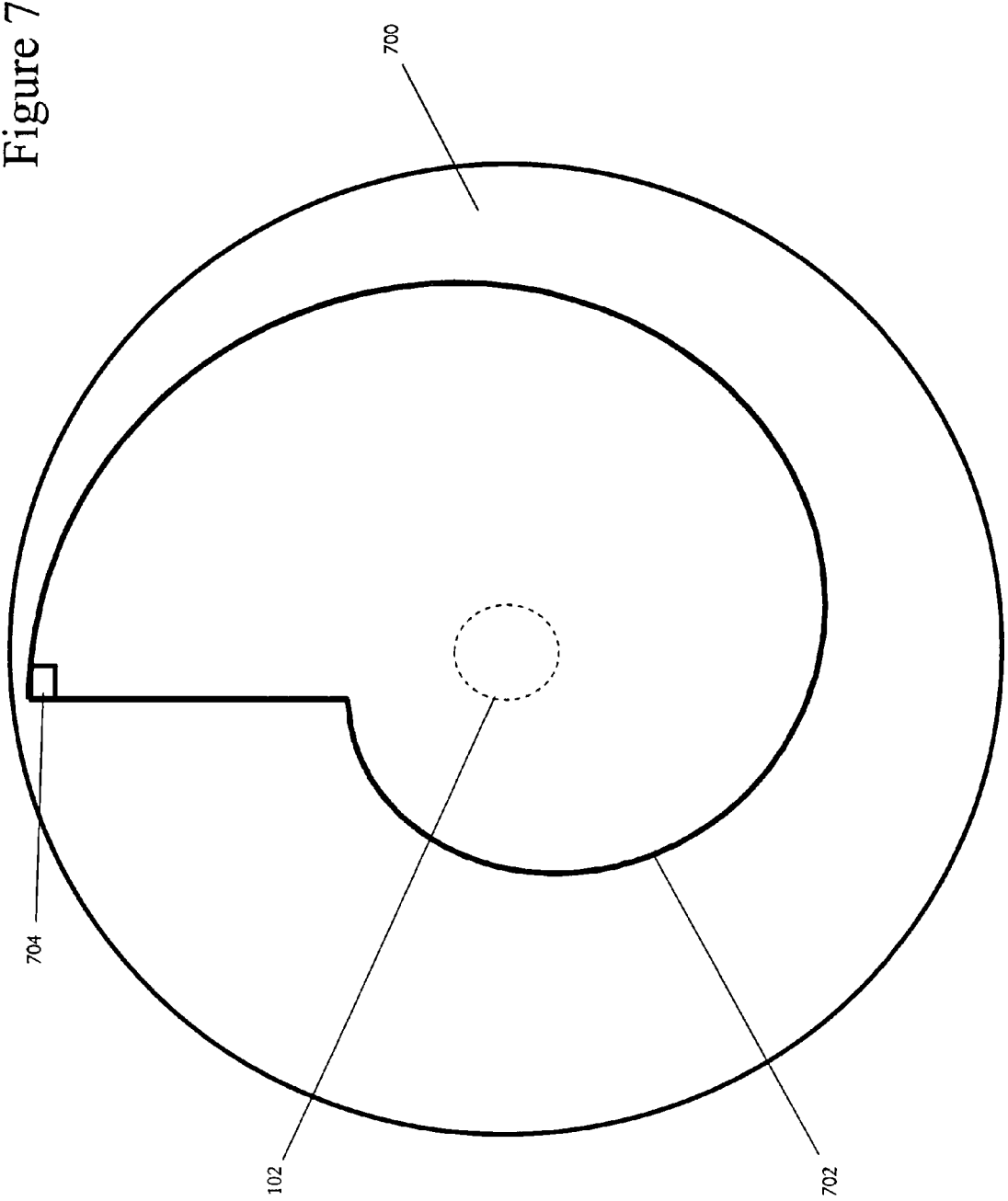

HIGH REPETITION RATE, LINEAR, TRUE TIME OPTICAL DELAY LINE

This application is a U.S. National Phase Application of PCT International Application No. PCT/US05/007500, filed Mar. 8, 2005, which is related to and claims the benefit of U.S. Provisional Application No. 60/551,459 entitled HIGH REPETITION RATE, LINEAR, TRUE TIME OPTICAL DELAY LINE filed on Mar. 9, 2004; U.S. Provisional Application No. 60/567,991 entitled INVOLUTE TIME DELAY STAGE filed on May 4, 2004; and 60/606,071 entitled COMPACT CIRCULAR INVOLUTE OPTICAL DELAY LINE filed on Aug. 31, 2004.

GOVERNMENT FUNDING

The U.S. Government has a paid-up license in the present invention and the right in limited circumstances to require the patent owner to license others on reasonable terms as provided by both contract as awarded by the National Science Foundation under funding number ECS-0140459 and ECS-0245461, and the Multi-University Research Initiative under funding number DAD19092010255.

FIELD OF THE INVENTION

The present invention relates generally to optical delay lines. More particularly the invention relates to optical delay that may have high repetition rates and high linearity.

BACKGROUND OF THE INVENTION

The photonic and optoelectronic communities have long been interested in the development of tunable delay systems for optical pulses. Such systems are important in both experiments and devices. Optical delay lines are an essential part of most time-resolved optical experiments, including time-domain terahertz technology, ultrafast optics research, time resolved detection, interferometric spectroscopy, optical coherence tomography, most optical pump/probe experiments, and other applications. The development of an optical delay line with long delay range (>1 ns) and high repetition rate (>100 Hz), however, poses a significant challenge. Thus, real world applications, such as long distance time-of-flight sensing and tomographic imaging, have not been feasible.

A simple form of optical delay line consists of a linear actuator, which moves a retro-reflector forward and backward as disclosed by R. F. Fork and F. A. Beissoer in their article "Real-time intensity autocorrelation interferometer," Appl. Opt. 17, 3534-3535 (1978). A retro-reflector is an instrument used to cause reflected radiation to return along paths parallel to those of their corresponding incident rays. The scanning velocity of such an optical delay line is limited, however, by mechanical inertia of the retro-reflector and the translation stage. The typical scanning speed of these optical delay lines is tens of centimeters per second and the repetition rate is generally limited to tens of hertz. Mechanical inertia also affects the linearity of the delay. At both ends of the delay sweep of the delay line, the motion of the retro-reflector must be slowed and then reversed, preventing the optical delay line from having a true linear delay scan function through the entire range. Additionally, the motion of the linear translation stage may not be sufficiently smooth to provide the desired linearity in the delay scan, or may have undesired hysteresis, particularly at high scan rates.

Various techniques have been developed for high-speed scanning. Although the methods disclosed in a number articles offer high-speed scanning, the delay ranges of their high speed devices are limited. Such techniques include, for example, using a piezoelectric transducer to replace the linear motor, delay lines based on a grating lens, rotation glass blocks, mirror arrays, spiral reflectors piezoelectric fiber stretchers, grating-lens based delay lines, helicoids mirrors, and multi-pass cavities among others.

Using a piezoelectric transducer to replace the linear motor, the delay line may have a kilohertz repetition rate; however, the scanning range is of such a delay line is very limited. A delay line based on a grating-lens was disclosed was disclosed by G. J. Tearney, B. E. Bouma, S. A. Boppart, B. Golubovic, E. A. Swanson, and J. G. Fujimoto in their article "Rapid acquisition of in vivo biological images by use of optical coherence tomography," Opt. Lett. 17 1408-1410 (1996). This optical delay line was able to increase the scanning speed up to tens of kilohertz. Unfortunately, all of these delay line scanners suffer from both low duty cycles and nonlinearity in optical path-length change.

Piezoelectric fiber stretchers having a repetition rate of 1.2 KHz were demonstrated by K. F. Kwong, D. Yankelevich, K. G. Chu, J. P. Heritage, and A. Dienes in their article "400-Hz mechanical scanning optical delay line," Opt. Lett. 18, 558-560 (1993), but the scanning range of a delay line of this type is limited and suffers from the birefringence effect. Chi-Luen Wang, Sheng-An Wang, S. C. Wang, and Ci-Ling Pan demonstrated a helicoid mirror based delay line in their article "Rapid and programmable wavelength tuning of an external-cavity diode laser," Conference on Lasers and Electro-optics (CLEO '98), Vol. 11, paper CWN5 (May 3-8, 1998, San Francisco, Calif.). These delay lines, developed from pulse shaper technology, may achieve a 2 KHz repetition rate at a 3 mm scanning range. They exhibit a severe bandwidth limitation, however, and are very costly to produce. More recently, several other delay line scanning systems have been demonstrated having high duty-cycles at rates above 2 KHz, including: a rotation prism array by N. G. Chen and Q. Zhu in their article "Rotary mirror array for high-speed optical coherence tomography," Opt. Lett. 27, 607-609 (2002); a rotation mirror array by X. Liu, M. J. Cobb, and X. Li in their article "Rapid scanning all-reflective optical delay line for real-time optical coherence tomography," Opt. Lett. 29, 80-82 (2004); and a multi-pass cavity by P. L. Hsiung, X. Li, C. Chudoba, I. Hartl, T. H. Ko, and J. G. Fujimoto in their article "High-speed path-length scanning with a multiple-pass cavity delay line," Appl. Opt. 42, 640-648 (2003). None of the above technologies, however, can provide both tens of centimeter scanning range and a repetition rate in the hundreds of hertz range.

True time delay devices based on switched fiber delay lines or optical coherent transient regenerators able to provide a long delay range (up to micro second delay with bit rates up to GHz) have been demonstrated. Switched fiber delay lines are discussed by A. Goutzoulis, K. Davies, J. Zomp, P. Hrycak, and A. Johnson in their article "Development and field demonstration of a hardware-compressive fiber-optic true-time-delay steering system for phased-array antennas," Appl. Opt. 33, 8173-8185 (1994) and optical coherent transient regenerators are discussed by K. D. Merkel, and W. R. Babbitt in "Optical coherent-transient true-time-delay regenerator," Opt. Lett. 15, 1102-1104 (1996). The temporal resolution of these devices was relatively low, however, and the devices suffered significant optical loss.

To overcome the shortcomings of existing optical delay lines, a design of a simple, high-speed, high duty-cycle, long range, and linear optical delay line based on scanning the optical beam along an involute curved reflector is provided. One aspect of the present invention provides a compact optical delay line based on a circular involute optical delay stage. Another aspect includes a reflector with a circular involute profile in the optical delay stage. A further aspect provides a compact delay stage for compact and portable optical time-resolved systems, which may require relatively long time delay at high scanning speeds. Still another aspect of the present invention provides a compact, simple, easily aligned system with features such as high scanning speed, linearity, and zero backlash.

SUMMARY OF THE INVENTION

An exemplary embodiment of the present invention is an optical delay line for use with an optical source including input/output optics optically coupled to the optical source and a curved mirror with an inner reflective surface having a curvature based on an involute curve calculated from an evolute circle of the optical delay line. The input/output optics direct light from the optical source along a delay line beam path, which is tangent to an edge of the evolute circle. The curved mirror is centered on an axis of the evolute circle to retro-reflect light traveling along the delay line beam path. The input/output optics direct the delayed light from the delay line beam path out of the optical delay line along an output beam path. At least one of the input/output optics and/or the curved mirror rotates about the axis of the evolute circle to controllably vary the delay of the optical delay line.

Another exemplary embodiment of the present invention is an optical delay line for use with an optical source including input/output optics optically coupled to the optical source and a curved mirror with an outer reflective surface having a curvature based on an involute curve calculated from an evolute circle of the optical delay line. The input/output optics direct light from the optical source along a delay line beam path, which is tangent to an edge of the evolute circle. The curved mirror is centered on an axis of the evolute circle to retro-reflect light traveling along the delay line beam path. The input/output optics direct the delayed light from the delay line beam path out of the optical delay line along an output beam path. The curved mirror rotates about the axis of the evolute circle to controllably vary the delay of the optical delay line.

An additional exemplary embodiment of the present invention is an optical delay line for use with an optical source including input/output optics optically coupled to the optical source and a curved mirror with a reflective surface that is centered about an evolute curve of the delay line to retro-reflect light traveling along a delay line beam path tangent to the edge of the evolute curve. The input/output optics direct light from the optical source along the delay line beam path and direct delayed light from the delay line beam path out of the optical delay line along an output beam path. The input/output optics and/or the curved mirror rotate about the evolute curve at a selected angular speed. The reflective surface has a curvature based on a parametric curve that is calculated from the evolute curve such that the delay of the delay line varies according to a predetermined function as the input/output optics and/or the curved mirror rotate.

A further exemplary embodiment of the present invention is an optical delay line for use with an optical source including input/output means and a curved mirror with an inner reflective surface having a curvature based on an involute curve calculated from an evolute circle of the optical delay line. The input/output means direct light from the optical source along a delay line beam path, which is tangent to an edge of the evolute circle. The curved mirror is centered on an axis of the evolute circle to retro-reflect light traveling along the delay line beam path. The input/output means also direct the delayed light from the delay line beam path out of the optical delay line along an output beam path. At least one of the input/output means and/or the curved mirror rotates about the axis of the evolute circle to controllably vary the delay of the optical delay line.

Yet another exemplary embodiment of the present invention is an optical delay line for use with an optical source including input/output means and a curved mirror with an outer reflective surface having a curvature based on an involute curve calculated from an evolute circle of the optical delay line. The input/output means direct light from the optical source along a delay line beam path, which is tangent to an edge of the evolute circle. The curved mirror is centered on an axis of the evolute circle to retro-reflect light traveling along the delay line beam path. The input/output means also direct the delayed light from the delay line beam path out of the optical delay line along an output beam path. The curved mirror rotates about the axis of the evolute circle to controllably vary the delay of the optical delay line.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

FIG. 7 is top plan drawing illustrating another exemplary curved mirror with an integral detector that may be used with an exemplary optical delay line according to the present invention.

DETAILED DESCRIPTION OF THE INVENTION

One exemplary embodiment of the present invention, a circular involute stage, which consists of an involute reflector with a pair of rotating mirrors, able to provide a nanosecond delay range at a repetition rate in the hundreds of hertz is described by inventors of the present invention, J. Z. Xu and X. -C. Zhang in their article "Circular Involute Stage," Opt. Lett. 29, 2082-2084 (2004). Inside this circular involute stage, a pair of rotation mirrors is used to steer the incident optical beam onto the involute reflector along a delay line beam path, following the tangent of the evolute circle of the involute reflector. When the mirror pair rotates about the center of the circle, the delay line beam path between the circle and the reflector changes, forming a variable delay line. Although seemingly simple, this circular stage with mirrors may be difficult to implement and align in a compact optical system. Additional exemplary embodiments may simplify alignment and improve the applicability of the present invention for uses in which a rugged compact system is desirable.

To achieve these and other objects, and in view of its purposes, another embodiment of the present invention provides a compact circular involute time delay line adapted to be used in optical equipment. The delay line has coupling optics to couple an optical beam into and out of the delay line, and a rotating reflector having an evolute circle and an outside surface defining a circular involute profile. The optical elements of the coupling optics direct the optical beam from an optical source to be incident the outside surface of the reflector along a tangent of the evolute curve, where the beam is retro-reflected. In one example, a compact circular involute time delay line with an evolute circle having a radius of approximately 2.5 mm and an involute reflector having dimensions of approximately 15.7 mm by 23.6 mm was constructed. It is noted that these dimensions were chosen for convenience and that other dimensions may be selected depending of the desired parameters for the exemplary optical delay line.

Figure 1:
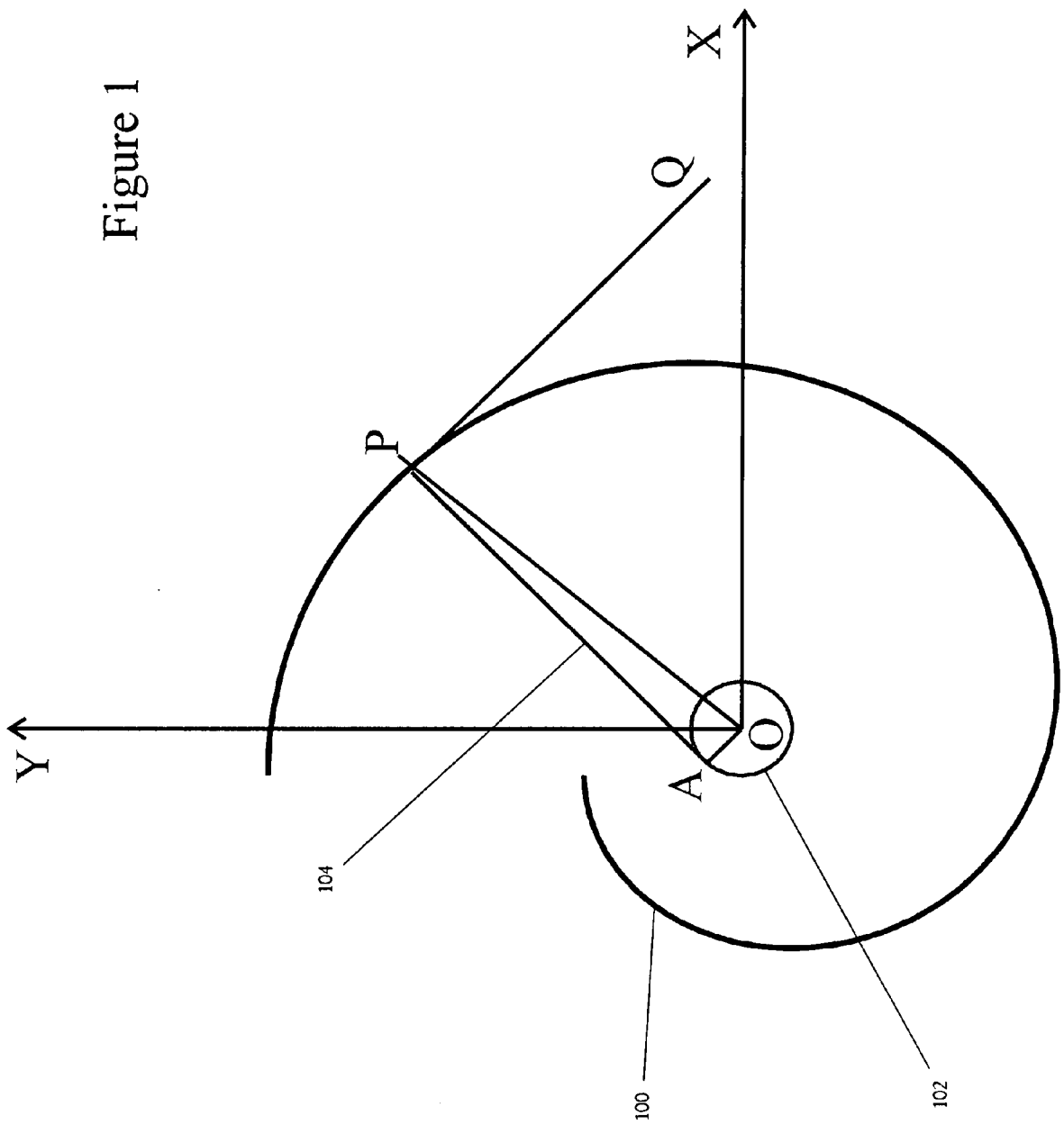
FIG. 1 is a graph illustrating an involute curve and corresponding evolute curve.

FIG. 1 illustrates involute curve 100 and its corresponding evolute circle 102. As background, in mathematics, the involute of a plane curve is the locus of a fixed point on a non-flexible or rigid string as it is unwound, under tension, from the curve. The involute of a circle is the curve described by the end of a thread as it is unwound from a stationary spool. An example of such a profile in nature is the cross-section of a nautilus. The parametric equations of the involute curve of a circle are:

$$x = a(\cos \phi + \phi \sin \phi)$$
$$y = a(\sin \phi - \phi \cos \phi) \quad (1)$$

where x, and y are the indices of the coordinate system, a is the radius of the evolute circle (line segment OA in the Figure), which is used to form the involute curve, and $\phi$ is the angle XOA. As a result:

$$\frac{dy}{dx} = \tan\phi \quad (2)$$

Therefore, the tangent of involute curve 100 at point P (line segment PQ) is parallel to radial line segment AO for all rotation angles $\phi$. Line segment 104 is thus both the tangent of evolute circle 102 at edge point A and the normal of involute curve 100 at point P. This means that if an optical beam follows line segment 104 from point A to point P, where it is incident on involute curve 100, it is retro-reflected directly back along line segment 104 in the opposite direction, i.e. from point P to point A.

The distance from evolute circle 102 to involute circle 100 along line segment 104 is $a\phi$, proportional to the radius of the evolute circle and the rotation angle. An optical delay line may be formed with a mirror rotating along the edge of evolute circle 102 to guide an optical beam along the tangent of the circle, line segment 104, to be incident on a curved mirror formed in the shape of involute curve 100. The resulting round trip delay range of such a delay line is $4\Pi a$ per rotation period. Although the various exemplary embodiments of the present invention are described below with reference to optical pulses, it is contemplated that the optical delay lines of the present invention may be used with continuous optical sources as well.

Figure 2:
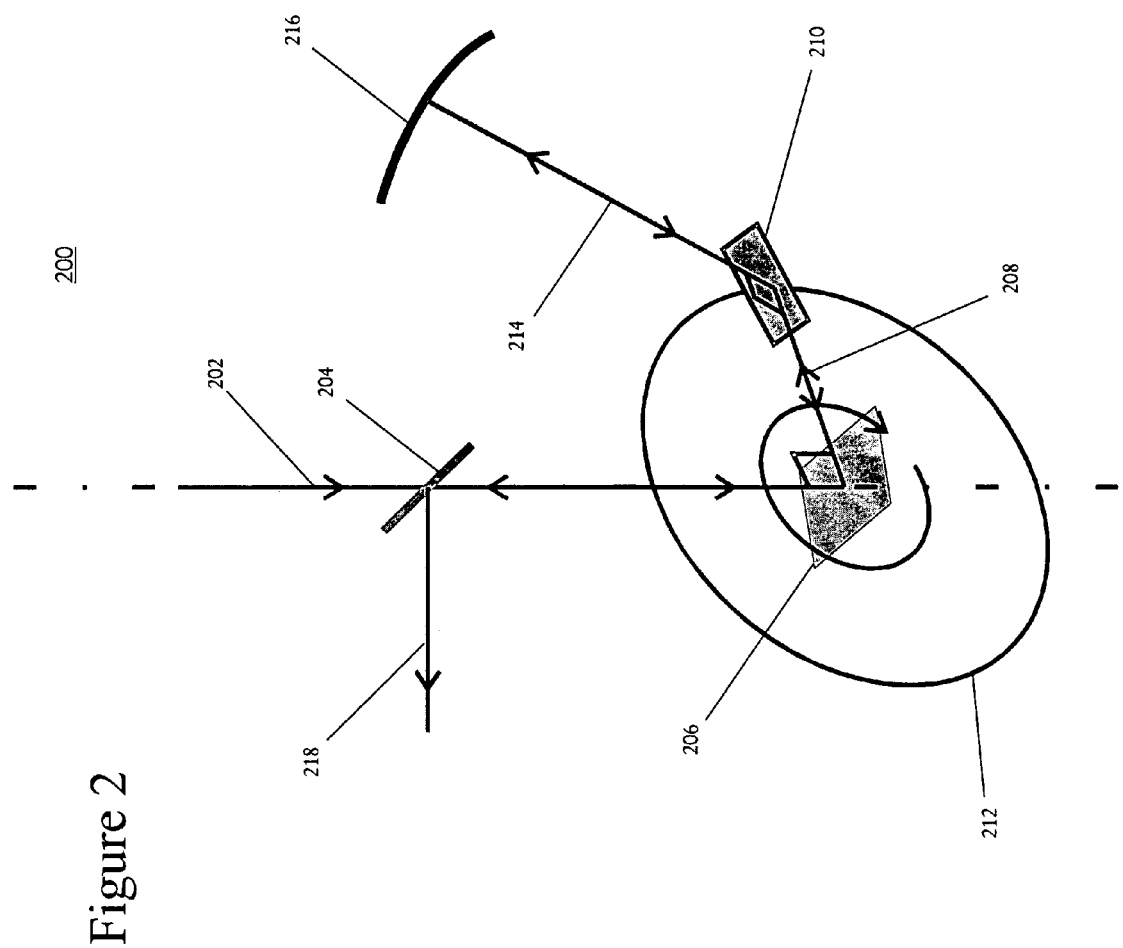
FIG. 2 is a schematic perspective drawing illustrating an exemplary optical delay line with an inner reflective surface according to the present invention.

One exemplary embodiment of the present invention is optical delay line 200 illustrated in FIG. 2, which uses an involute reflector, curved mirror 216, and a pair of rotation mirrors 206 and 210 to perform a time delay line for optical pulses, or other light sources. It is noted that only a portion of curved mirror 216 is shown in FIG. 2 to simplify the illustration. One skilled in the art may understand that curved mirror 216 desirably extends through an entire angular range of $2\Pi$ around evolute circle 212. This exemplary optical delay line may provide a long scan, high repetition rate, and linear range. As described above with respect to FIG. 1, the delay range of such a delay line is proportional to the rotation angle ($2\Pi$ periodic) and the radius of evolute circle 212. Thus, exemplary optical delay line 200 may provide an arbitrarily long delay scanning range. It may also provide a high scan speed.

Exemplary optical delay line 200 includes input/output optics to direct pulses of light, from a pulsed optical source (not shown), along delay line beam path 214 and to direct delayed pulses of light from delay line beam path 214 out of optical delay line 200 along output beam path 218 and a curved mirror (portion 216 shown) with an inner reflective surface. The input/output optics include beam splitter 204, first mirror 206 located at the center of evolute circle 212, and second mirror 210 located on the edge of evolute circle 212.

As shown in FIG. 2, pulses of light enter optical delay line 200 along incoming beam path 202, which is desirably coaxial to the axis of evolute circle 212, and pass through beam splitter 204. The pulses continue along the axis of evolute circle 212 and are reflected by first mirror 206. First mirror 206 is shown in FIG. 2 arranged to pass through the plane of evolute circle 212 at about a 45° angle to direct the pulses along radius 208. Second mirror 210 is located on the edge of evolute circle 212 at the end of radius 208 and is desirably aligned such that the pulses traveling along radius 208 are incident at about a 45° angle to reflect these pulses along optical delay line path 214, i.e. the tangent of evolute circle 212. In this exemplary embodiment, first mirror 206 and second mirror 210 are desirable rigidly connected to maintain their alignment. It is noted that, in an alternative embodiment, first mirror 206 may be located above, or below, the plane of evolute 212, in which case the desired angle of the axis of evolute circle 212 relative to first mirror 206 is less than, or greater than, about 45°. The pulses of light then travel along a beam path in a plane that is perpendicular to and that passes through the axis of evolute circle 212 to second mirror 210. Second mirror 210 is desirably tilted such that the pulses may be directed along the delay line beam path. Thus, the angle of incidence of the pulses of light upon second mirror 210 remains about 45° in this alternative embodiment.

The inner reflective surface of curved mirror 216 desirably has a curvature based on an involute curve calculated from evolute circle 212. Additionally, in exemplary optical delay line 200, the inner reflective surface of curved mirror 216 has a planar cross-sectional shape in the plane perpendicular to evolute circle 212. Thus, as described above with reference to FIG. 1, delay line optical beam path 214 is normally incident on the inner reflective surface of curved mirror 216, irrespective of the location along the curve at which delay line optical beam path 214 is incident. Therefore, the pulses are retro-reflected from curved mirror 216 and return along delay line optical beam path 214 to second mirror 210, then along radius 208 to first mirror 206, then along the axis of evolute circle 212 to beam splitter 204. Beam splitter 204 couples the delayed pulses out exemplary optical delay line 200 along output beam path 218.

The amount of delay imparted by exemplary optical delay line 200 may be varied by rotating first and second mirrors 206 and 210 about the axis of evolute circle 212, as shown in FIG. 2. Because these mirrors are desirably rigidly coupled together, delay line beam 214 may be continually directly along lines tangent to evolute circle 212 and normal to curved mirror 216 while the first and second mirrors are rotated. Desirably, a high precision rotation stage (not shown) that may be controlled by a computer or other processor may be used to rotate first and second mirrors 206 and 210. The processor may desirably control the rotation speed of the high precision, controllable rotation stage, and thereby control the rate of change of the delay of the optical delay line. It is noted that the rotation stage may be operated in a continuous scanning mode or a stepped rotation mode.

Alternatively, curved mirror 216 may be rotated about the axis of evolute circle 212 while first and second mirrors 206 and 210 remain fixed. Rotating curved mirror 216 may ease some difficulties associated with maintaining alignment of the first and second mirrors as they are rotated. Also, if only curved mirror 216 is rotated about the axis of evolute circle, it may be desirable to omit first mirror 206 and align beam splitter 204 and mirror 210 along a tangent of the evolute circle such that i) the pulses of light from the beam splitter are reflected directly by mirror 210 along delay line beam path 214 and ii) the delayed pulses of light are reflected directly back to the beam splitter.

It is noted, however, that in many cases the moment of inertia of curved mirror 216 may be significantly greater than that of an assembly including the first and second mirrors. This increased moment of inertia may limit the maximum practical rotation speed of curved mirror 216 and, thus, the maximum repetition rate of an exemplary optical delay line in which the curved mirror is rotated.

Additionally, it is noted that whether the curved mirror is rotated or the first and second mirrors are rotated, it is desirable for the rotating component to be balanced to reduce wobbling that may result otherwise. It is also noted that it is possible to rotate both curved mirror 216 and first and second mirrors 206 and 210. If these components are rotated in opposite directions the repetition rate may be increased while maintaining reduced absolute rotational speeds.

The delay distance and the delay resolution of an exemplary optical delay line according to the present invention are:

$$D = 2a\Delta\phi$$

$$d = 2a\delta\phi \tag{3}$$

where D and d are the delay distance and resolution respectively, $\Delta\phi$ and $\delta\phi$ are the rotation angle and angle resolution respectively. The relative temporal delay of the involute stage as a function of the rotation angle is:

$$t = 2a\Delta\phi/c \tag{4}$$

where c is the speed of light.

For example, if the radius of the involute circle, a, is set as 5 cm, the total scanning range for one circle rotation is 62.8 cm. The resolution of the delay line is dependent on the signal acquisition time for a continuous scanning mode or the angle resolution of the rotation stage for a discrete scanning, stepped rotation, mode. In this example, a rotation of 1° represents a delay distance of 1.7 mm. A rotation stage with a resolution of $10^{-3}$° or better may exhibit a delay resolution of 1.7 μm distance, or 5.7 fs in time.

It is noted that the repetition rate of the scanning is dependent on the angular speed of the rotation stage. For example, if an angular speed of 6000 rpm is used, the repetition rate of the exemplary optical delay line may reach 100 Hz, or if a high-speed rotation stage with an angular speed of 100,000 rpm is used, a repetition rate of greater than 1 KHz may be achieved.

Two factors may limit the temporal resolution of an exemplary optical delay line according to the present invention: the angular resolution of the rotation stage and the divergence of the optical beam, which may desirably be a laser beam. When a step-controlled motor is used as a rotation stage for the rotation mirror pair 206 and 210, the angular resolution is determined by the motor. Commercial rotation stages that provide an angular resolution as small as 1 millidegree are available. This angular resolution corresponds to a 9 fs temporal resolution for an exemplary optical delay line with a 1 meter delay range. On the other hand, when the rotation mirror pair undergoes continuous movement, the angular resolution may be determined by the swiftness of signal acquisition, which is a limitation for any type of delay stage. Thus, a femtosecond laser with an 80 MHz repetition rate may support an exemplary optical delay line with a 1 meter delay range scanning at 240 Hz, if a 10 fs temporal resolution is required.

The divergent angle of the optical beam may also limit the temporal resolution, as the different parts of the beam spot are incident on different portions of the involute reflector having slightly different lengths. The temporal resolution limited by the beam divergent angle may be expressed as:

$$\tau = \frac{a}{12}\delta\varphi^3 \tag{5}$$

where $\delta\phi$ is the divergent angle of the optical beam. For example a=8 cm, which provides a 1 meter delay range, a divergent angle of less than 36 mrad is necessary to obtain a temporal resolution better than 1 fs. This value may be reasonable for most commercial femtosecond laser systems.

A related issue is the curvature of curved mirror 216. The inner involute reflector surface of curved mirror 216 is normal to delay line optical path 214, but still has some curvature, at each point along its surface. Therefore, there may be some focusing of the pulses on reflection. The radius of the involute curve is:

$$R = \frac{(1 + (dy/dx)^2)^{3/2}}{d^2y/dx^2} = a\varphi. \tag{6}$$

Equation (6) indicates that at each point on curved mirror 216, the radius of the involute curve equals the length of delay line beam path 214. As a result, if the input beam is focused at second mirror 210 by a cylinder lens, or other compensating optical element (not shown), the retro-reflected beam from curved mirror 216 may be focused at the same point. Hence, reflected beam divergence from curved mirror 216 may be easily compensated in exemplary optical delay line 200. Although, this divergence of the optical beam may limit the delay resolution, as described above, other factors may outweigh this concern. For example, if a delay stage has a delay distance in the meter range, the delay resolution due to beam divergence is not likely to be significant compared to the delay resolution due to the rotation resolution and data acquisition speed.

Figure 3:
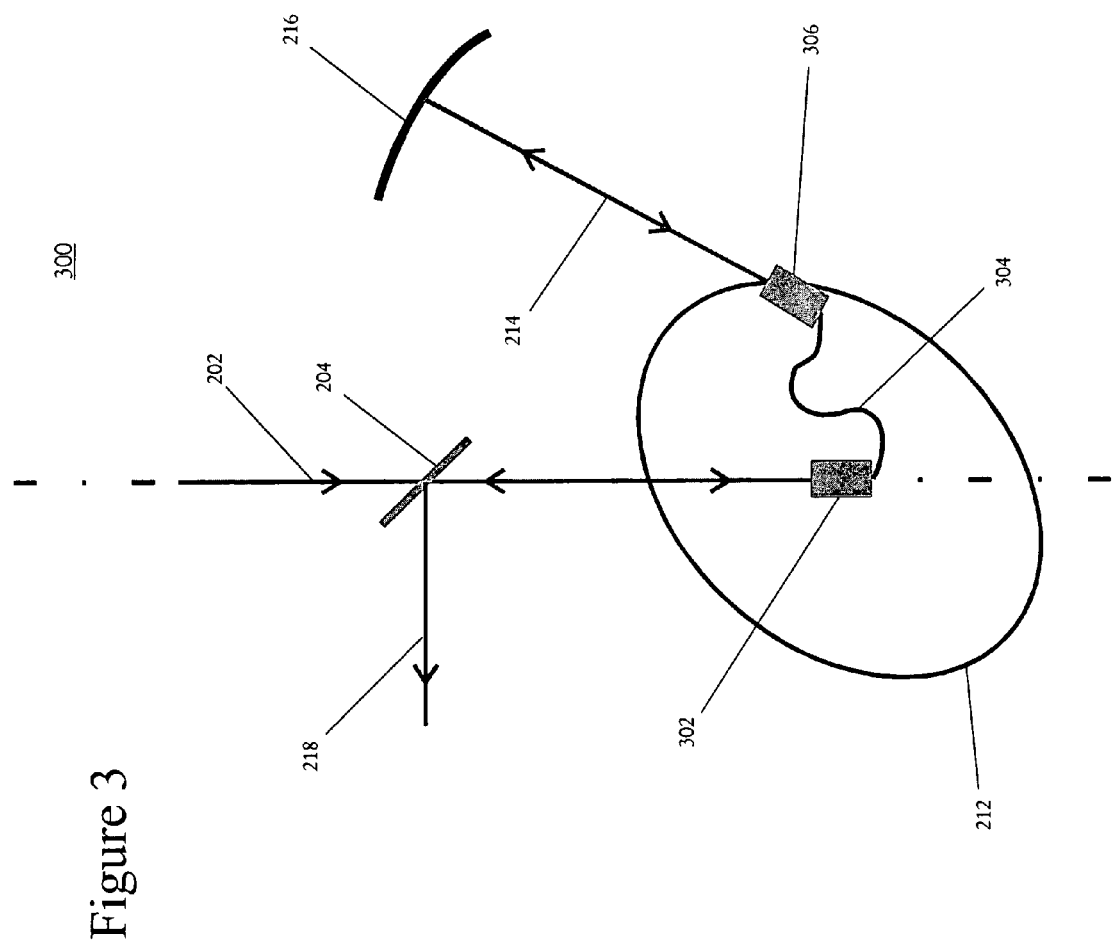
FIG. 3 is a schematic perspective drawing illustrating an alternative exemplary optical delay line with an inner reflective surface according to the present invention.

FIG. 3 illustrates alternative exemplary optical delay line 300, which includes two lenses 302 and 306 coupled by optical fiber 304. The lenses may desirably be graded index (GRIN) lenses, or other type lenses commonly used to couple light into and out of optical fibers. The exemplary optical fiber link is used in the place of first and second mirrors 206 and 210 in the input/output optics of this exemplary optical delay line. The use of this optical fiber link may make the delay line easier to align. First GRIN lens 302 may improve optical coupling between optical fiber 304 and beam splitter 204, but may be omitted if adequate coupling is achieved without this component. Second GRIN lens 306 may desirably provide compensation for the curvature of curved mirror 216 as described above with respect to the exemplary embodiment of FIG. 2. As in the exemplary embodiment of FIG. 2, either the input/output optics, i.e. the fiber link, or the curved mirror may be rotated to vary the delay distance. It is noted that, although first GRIN lens 302 is illustrated in FIG. 3 as being located on the axis of evolute circle 212, if only curved mirror 216 is rotated to vary the delay distance, then this end of the fiber link may desirably be located anywhere convenient to couple the pulses into and out of it. Additionally, it is noted that a multiport fiber coupler may be used as beam splitter 204 and may be coupled directly to optical fiber 304.

Similarly to exemplary optical delay line 300, the first and second mirrors in exemplary optical delay line 200 may be replaced by a planar waveguide structure. This exemplary planar waveguide structure has a first end located on the axis of the evolute circle which is optically coupled to the beam splitter and a second end on the edge of the evolute circle. The second end of the planar waveguide structure is desirably arranged to i) direct the pulses of light to curved mirror 216 along delay line beam path 214 and ii) receive the delayed pulses of light reflect by curved mirror 216.

Figure 4:
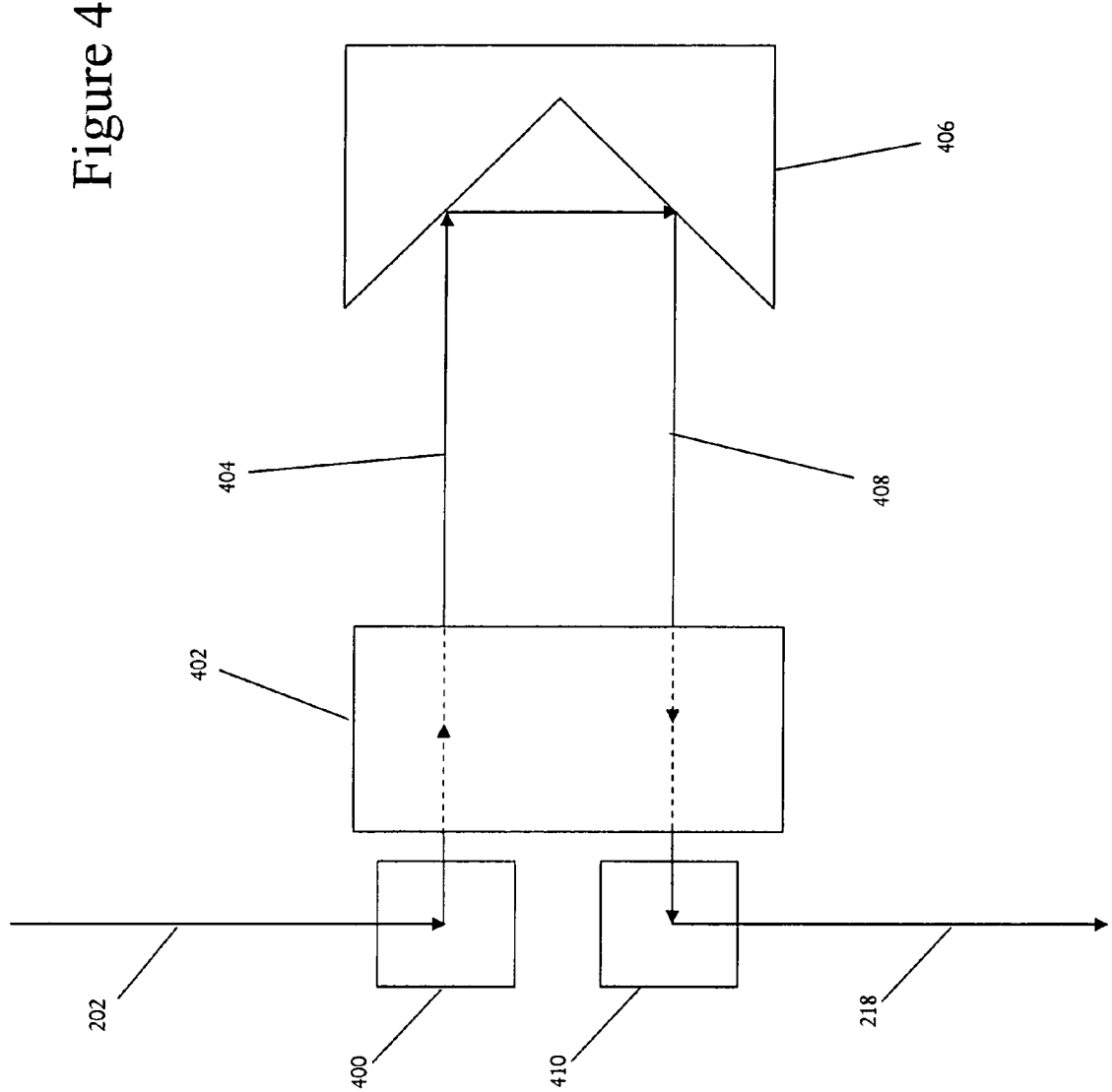
FIG. 4 is a side cut-away drawing illustrating an exemplary optical delay line with an inner reflective surface having a chevron cross-section according to the present invention.

FIG. 4 illustrates a cut away drawing of another exemplary embodiment of the present invention. In this exemplary optical delay line, curved mirror 406 (shown in cross-section) has an inner reflective surface with a chevron cross-sectional shape in a plane perpendicular to the evolute circle. The light from the optical source is coupled into the optical delay line along incoming beam path 202, which desirably follows the axis of the evolute circle from one side. The incoming light is incident on first mirror 400 at a center of the evolute circle on this side. First mirror 400 is arranged to reflect the light along a radius of the evolute circle on this first side. Second mirror 402 on the edge of the evolute circle then reflects the light from the first radius of the evolute circle along first arm 404 of the delay line beam path to curved mirror 406. As shown in FIG. 4 the chevron cross-sectional of curved mirror 406 causes the light to be reflected back along a parallel path, second arm 408 of the delay line beam path, which is offset in a direction parallel to the axis of the evolute circle from first arm 404. Second mirror 402 then reflects the delayed light returning on second arm 408 of the delay line beam path along a radius of the evolute circle on a second side of the circle. This second side radius of the evolute circle being parallel to the first side radius and offset in the direction parallel to the axis of the evolute circle. Third mirror 410 located at the center of the evolute circle on the second side reflects the delayed light from the second radius along output beam path 218, which runs along the axis of the evolute circle from the second side. It is noted that mirror 402 may be separated into two smaller mirrors, each arranged to reflect light on one of the sides of the evolute circle.

This exemplary optical delay line may desirably allow light passing through it, such as optical pulses, to be coupled into and out of the optical delay line on separate beam paths, alleviating the need for a beam splitter. As with the previously described exemplary embodiments, either the input/output optics or the curved mirror may be rotated. One skilled in the art may also understand that exemplary embodiments of the present invention using curved mirrors having a reflective surface with a chevron cross-sectional shape may also be used with optical fiber based input/output optics (which may include two optical fiber links) and planar waveguide based input/output optics (which may include two planar waveguide structures).

Figure 5:
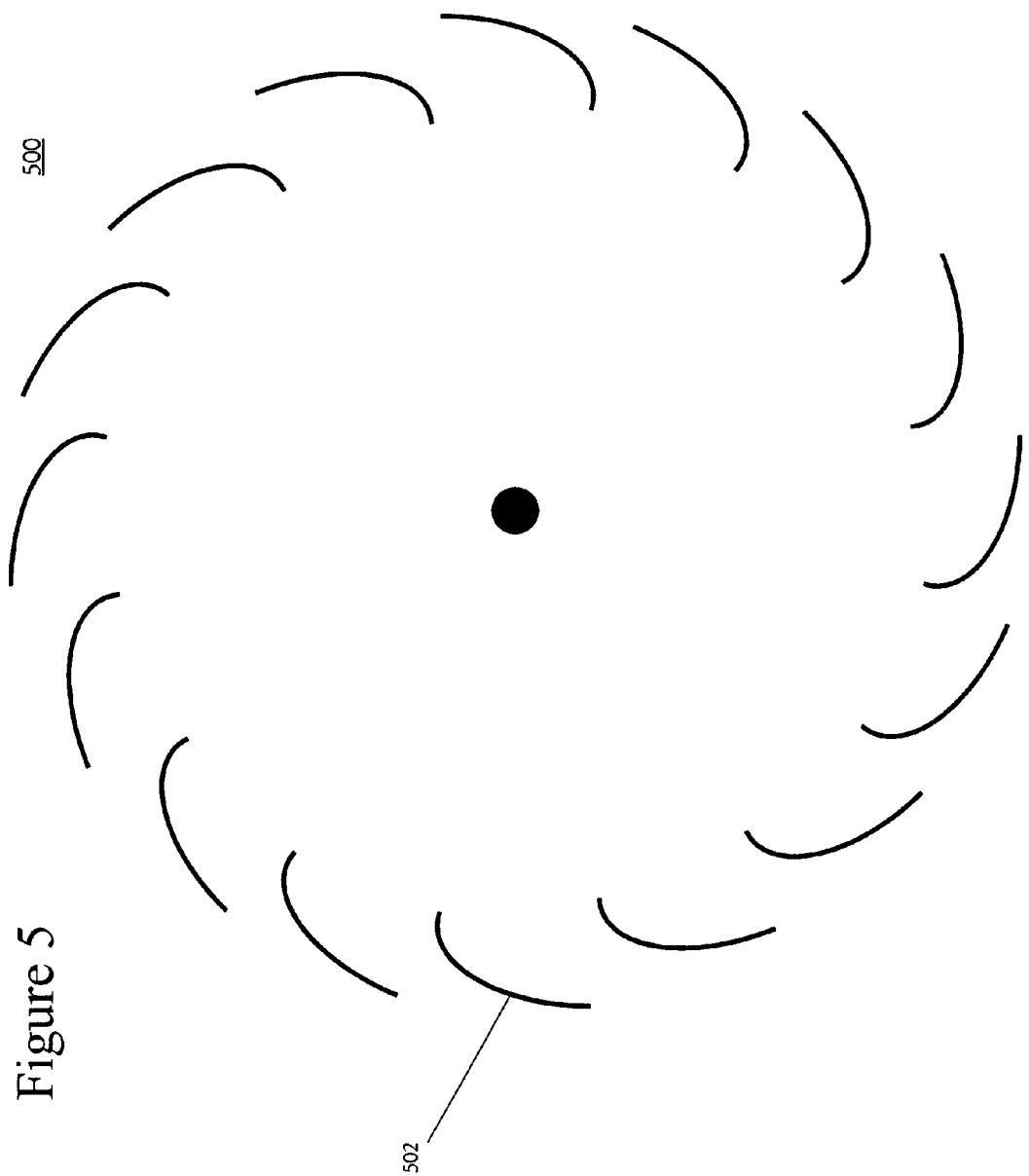
FIG. 5 is a top plan drawing illustrating an exemplary curved mirror having multiple sections that may be used with an exemplary optical delay line according to the present invention.

FIG. 5 illustrates a top view of another exemplary curved mirror 500 that may be used in the various embodiments of the present invention. For applications in which high repetition rates are desirable, this exemplary embodiment may prove particularly useful. Exemplary curved mirror 500 includes an integral number, N, of substantially identical sections 502. In exemplary curve mirror 500, N=16. The selection of this number of section is merely illustrative and is not intended to be limiting. The curvature of each substantially identical section 500 is based on the involute curve calculated from the evolute circle over a range of angles from $\theta_0$ to $\theta_0+2\Pi/N$. This reflector array may be used to increase the repetition rate of an exemplary optical delay line by a factor of N. At the same time, the use of a curved mirror that includes multiple substantially identical sections, such as exemplary curved mirror 500, reduces the delay range by a factor of N.

Figure 6:
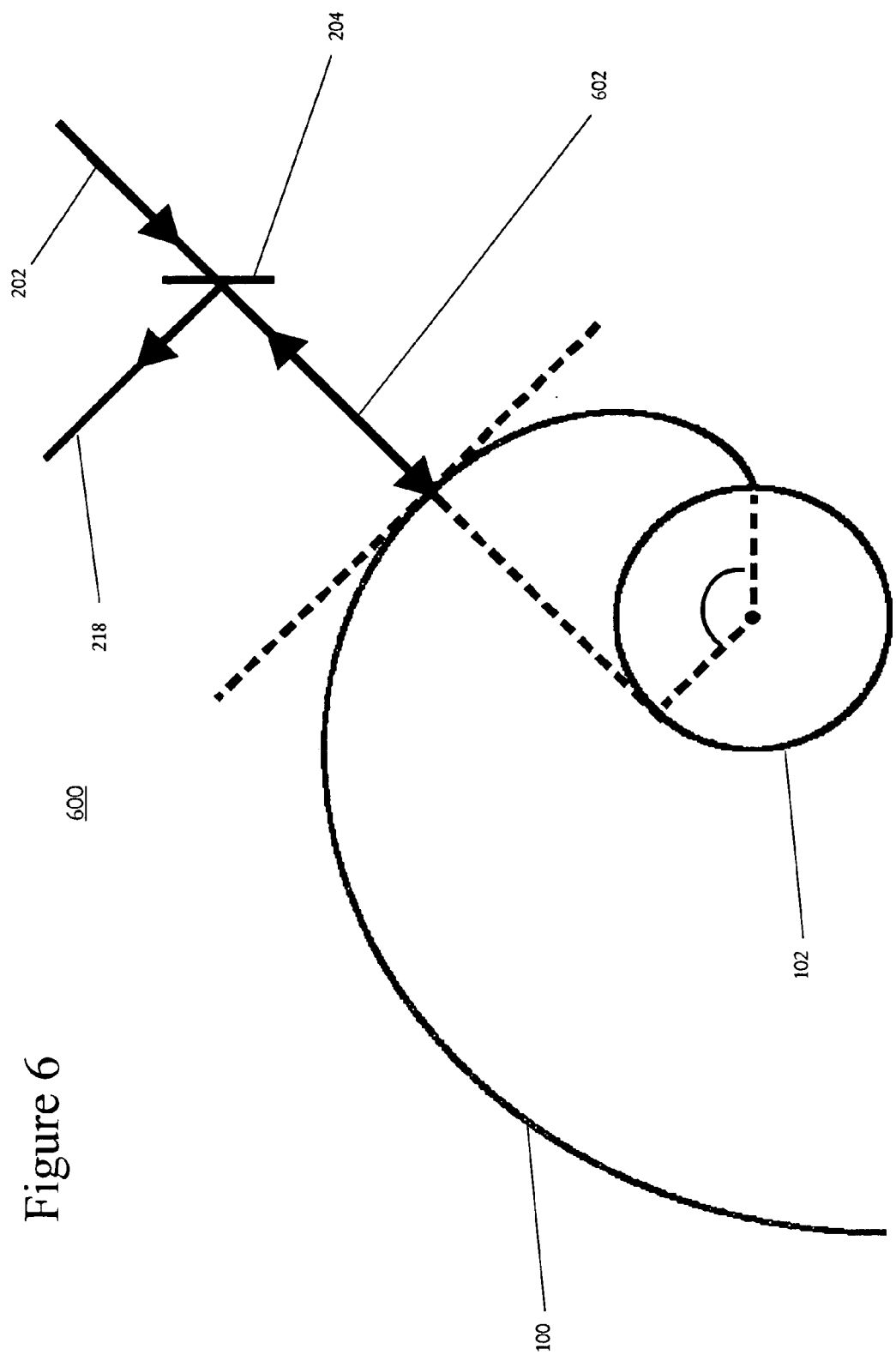
FIG. 6 is a top plan drawing illustrating an exemplary optical delay line with an outer reflective surface according to the present invention.

FIG. 1 and Equations 1 and 2 illustrate the geometric principles that cause line segment 104, the tangent to evolute circle 102, to be normally incident on involute curve 100 from the inside. As illustrated in FIG. 6, the continuation of this line segment is also normally incident on the outer side of involute curve 100. Also, it may be understood that the length of a delay line beam path extending from the outer side of the involute curve to a fixed point along this line segment varies in the same linear manner as inner delay line beam path 214 in the previously described embodiments, but with a slope having the opposite sign. It is noted that the sign of the slope of the delay may be changed by reversing the direction of rotation of the rotating component. Another exemplary embodiment of the present invention, exemplary optical delay line 600, uses these facts to produce a compact delay line that may be more stable and easily aligned than some of the other exemplary embodiment of the present invention.

A circular stage with mirrors directing the optical beam toward an inner reflective surface, as shown in FIGS. 2, 3, and 4, may be difficult to implement in a compact optical system, due to the complexity of alignment and handling. In the embodiment of FIG. 6, some of these difficulties may be reduced. It is compact, simple, easy to align, and features the advantages of an involute stage, such as speed, linearity, and zero back-slash.

In the exemplary embodiment of FIG. 6, the input/output optics are simplified to include only beam splitter 204 to couple pulses traveling along incoming beam path 202 into delay line beam path 602 and to couple delayed pulses from the delay line beam path to output beam path 218. The curved mirror which has an outer reflective surface a curvature based on an involute curve 100 may be rotated about the axis of evolute curve 100 to vary the length of delay line beam path 602. An exemplary curved mirror of exemplary optical delay line 600 may be formed as a solid structure to improve mechanical stability without increasing its size and may have inner portions removed to balance the curved mirror to reduce wobble and/or stress on the rotation stage during rotation.

It is noted that the input/output optics may also desirably include converging optics to substantially compensate for a curvature of the outer reflective surface of curved mirror 100 in a plane parallel to the evolute circle. As discussed above with regard to FIG. 1, an optical beam that diverges in the plane of the evolute circle from a point on the edge of evolute circle 102 along a tangent of the evolute circle is focused back to that point when retro-reflected off of an inner reflective surface formed in an involute curve. Due to the reversibility of optical paths, it may be understood that an optical beam focused in the plane of the evolute circle at a point on the edge of evolute circle 102 along a tangent of the evolute circle is retro-reflected by an outer reflective surface formed in involute curve 100 to diverge at the same angle that it was converging when incident on the surface. Therefore, a simple cylindrical lens may provide compensation for the curvature of a curved mirror formed with an outer reflective surface based on involute curve 100 through all angles as the curved mirror is rotated.

As with the exemplary embodiments involving a curved mirror with an inner reflective surface, an exemplary curved mirror of exemplary optical delay line 600 may have a planar cross-sectional shape or a chevron cross-sectional shape in a plane perpendicular to the evolute circle. Also, it is noted that a multi-section curved mirror as illustrated in FIG. 5 may be formed with an outer reflective surface and used in exemplary optical delay line 600.

FIG. 7 illustrates another exemplary curved mirror 700 that may be used in exemplary optical delay lines according to the present invention. Involute reflector 702 of exemplary curved mirror 700 extends for slightly less than one loop (i.e. it has an angular range of $\theta_0$ to $\theta_0+2\Pi-\epsilon$). Detector 704, such as a photo diode, is located in the angular gap between the beginning and the end of involute reflector 702. Detector 704 may detect the light once in each rotation circle and provide a signal that may be used to trace the rotation rate. This signal is used to trigger a recording instrument, such as a lock-in amplifier or oscilloscope or to assist in feedback control of the repetition rate of the optical delay line. It is noted that more that one gap may be made in the reflective surface of the curved mirror to accommodate multiple detectors and provide more precise feedback control of the repetition rate and linearity of the optical delay line. Also a detector may also be incorporated into a curved mirror with an outer reflective surface, such as illustrated in FIG. 6.

The various exemplary embodiments of the present invention describe an optical delay line based on a curved mirror with a reflective surface having a curvature that is based on a parametric curve. This parametric curve may be calculated from an evolute curve, such as a circle, that leads to an optical delay line with a delay that varies according to a predetermined function, such as a sawtooth function when at least one of the input/output optics or the curved mirror is rotated about the axis of the evolute curve at a selected angular speed. Although the foregoing descriptions have involved curved mirrors based on involute curves calculated from evolute circles, it is contemplated that exemplary optical delay lines in which the delay varies according to other, possibly non-linear, functions may be designed with proper selection of the parametric curve and evolute curve. Such non-linear delay lines may be useful in time resolved chemical experiments in which important phenomena may occur on several time scales.

Exemplary optical delay lines of the present invention may offer a number of advantages over other types of optical delay lines, including: a time delay that is linearly proportional to the rotation angle ($2\Pi$ periodic) with no requirement of an algorithm to correct the delay; a time delay with a high repetition into the kilohertz range and a long scan range (up to meters); a delay stage that does not have back-lash or hysteresis issues; long range scanning may be performed using less power due to scanning of the optical beam rather than scanning of retro-reflector to generate the time delay; and an optical scanning distance that is double the mirror moving distance.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed is:

1. An optical delay line for use with an optical source comprising:
   input/output optics optically coupled to the optical source to direct light from the optical source along a delay line beam path and to direct delayed light from the delay line beam path along an output beam path, the delay line beam path being tangent to an edge of an evolute circle of the optical delay line; and
   a curved mirror with an inner reflective surface having a curvature based on an involute curve calculated from the evolute circle, the curved mirror being centered on an axis of the evolute circle to retro-reflect light traveling along the delay line beam path,
   wherein at least one of the input/output optics and/or the curved mirror rotates about the axis of the evolute circle to controllably vary the delay of the optical delay line.

2. The optical delay line of claim 1, wherein:
   the inner reflective surface of the curved mirror has a planar cross-sectional shape in a plane perpendicular to the evolute circle; and the input/output optics comprise:
   a beam splitter to i) couple the light from the optical source into the optical delay line along the axis of the evolute circle and ii) couple the delayed light out of the optical delay line along the output beam path;
   a first mirror at a center of the evolute circle arranged to i) reflect the light from the optical source along a radius of the evolute circle and ii) reflect the delayed light along the axis of the evolute circle; and
   a second mirror on the edge of the evolute circle arranged to i) reflect the light from the radius of the evolute circle along the delay line beam path and ii) reflect the delayed light along the radius of the evolute circle.

3. The optical delay line of claim 1, wherein:
the inner reflective surface of the curved mirror has a chevron cross-sectional shape in a plane perpendicular to the evolute circle;
the light from the optical source is coupled into the optical delay line along the axis of the evolute circle from a first side; and
the input/output optics comprise:
   a first mirror at a center of the evolute circle arranged to reflect the light from the optical source along a first radius of the evolute circle;
   a second mirror on the edge of the evolute circle arranged to i) reflect the light from the first radius of the evolute circle along a first arm of the delay line beam path and ii) reflect the delayed light from a second arm of the delay line beam path along a second radius of the evolute circle, the first arm of the delay line beam path being parallel to the second arm of the delay line beam path and offset in a direction parallel to the axis of the evolute circle, and the first radius of the evolute circle being parallel to the second radius of the evolute circle and offset in the direction parallel to the axis of the evolute circle; and
   a third mirror at the center of the evolute circle arranged to reflect the delayed light from the second radius of the evolute circle along the axis of the evolute circle from a second side.

4. The optical delay line of claim 1, wherein:
the inner reflective surface of the curved mirror has a planar cross-sectional shape in a plane perpendicular to the evolute circle; and
the input/output optics comprise:
   a beam splitter to i) couple the light from the optical source into the optical delay line and ii) couple the delayed light out of the optical delay line along the output beam path; and
   an optical fiber having a first end optically coupled to the beam splitter and a second end on the edge of the evolute circle arranged to i) direct the light to the curved mirror along the delay line beam path and ii) receive the delayed light reflect by the curved mirror.

5. The optical delay line of claim 1, wherein:
the inner reflective surface of the curved mirror has a chevron cross-sectional shape in a plane perpendicular to the evolute circle; and
the input/output optics comprise:
   a first optical fiber having a first input end optically coupled to the optical source and a first output end on the edge of the evolute circle arranged to direct the light to the curved mirror along a first arm of the delay line beam path; and
   a second optical fiber having a second input end on the edge of the evolute circle arranged to receive the delayed light reflected by the curved mirror along a second arm of the delay line beam path and a second output end to couple the delayed light out of the optical delay line.

6. The optical delay line of claim 1, wherein:
the inner reflective surface of the curved mirror has a planar cross-sectional shape in a plane perpendicular to the evolute circle; and
the input/output optics comprise:
   a beam splitter to i) couple the light from the optical source into the optical delay line and ii) couple the delayed light out of the optical delay line along the output beam path; and
   a planar waveguide structure having a first end optically coupled to the beam splitter and a second end on the edge of the evolute circle arranged to i) direct the light to the curved mirror along the delay line beam path and ii) receive the delayed light reflect by the curved mirror.

7. The optical delay line of claim 1, wherein:
the inner reflective surface of the curved mirror has a chevron cross-sectional shape in a plane perpendicular to the evolute circle; and
the input/output optics comprise:
   a first planar waveguide structure having a first input end optically coupled to the optical source and a first output end on the edge of the evolute circle arranged to direct the light to the curved mirror along a first arm of the delay line beam path; and
   a second planar waveguide structure having a second input end on the edge of the evolute circle arranged to receive the delayed light reflect by the curved mirror along a second arm of the delay line beam path and a second output end to couple the delayed light out of the optical delay line.

8. The optical delay line of claim 1, wherein the input/output optics comprise diverging optics to substantially compensate for a curvature of the inner reflective surface of the curved mirror in a plane parallel to the evolute circle.

9. The optical delay line of claim 1, wherein the inner reflective surface of the curved mirror comprises an integral number, N, of substantially identical sections, the curvature of each substantially identical section based on the involute curve calculated from the evolute circle over a range of angles from $\theta_0$ to $\theta_0+2\Pi/N$.

10. The optical delay line of claim 1, further comprising:
   a controllable rotation stage coupled to one of the input/output optics and/or the curved mirror; and
   a processor electrically coupled to the high precision, controllable rotation stage to control a rotation speed of the high precision, controllable rotation stage, thereby controlling a rate of change of the delay of the optical delay line.

11. The optical delay line of claim 1, wherein:
only the curved mirror rotates about the axis of the evolute circle to controllably vary the delay of the optical delay line;
the inner reflective surface of the curved mirror has a planar cross-sectional shape in a plane perpendicular to the evolute circle; and
the input/output optics comprise:
   a beam splitter to i) couple the light from the optical source into the optical delay line and ii) couple the delayed light out of the optical delay line along the output beam path; and a mirror located along a tangent of the evolute circle arranged to i) reflect the light from the beam splitter along the delay line beam path and ii) reflect the delayed light to the beam splitter.

12. The optical delay line of claim 1, wherein:
only the curved mirror rotates about the axis of the evolute circle to controllably vary the delay of the optical delay line;
the inner reflective surface of the curved mirror has a chevron cross-sectional shape in a plane perpendicular to the evolute circle;
the light from the optical source are coupled into the optical delay line from a first side of the evolute circle; and
the input/output optics comprise:
a first mirror located along a first tangent of the evolute circle arranged to reflect the light from the optical source along a first arm of the delay line beam path; and
a second mirror located along a second tangent of the evolute circle arranged to reflect the delayed light from a second arm of the delay line beam path along the output beam path, the first tangent of the evolute circle being parallel to the second tangent of the evolute circle and offset in a direction parallel to the axis of the evolute circle, the first arm of the delay line beam path being parallel to the second arm of the delay line beam path and offset in the direction parallel to the axis of the evolute circle, and the output beam path extending from the second side of the evolute circle.

13. The optical delay line of claim 1, wherein:
the inner reflective surface of the curved mirror extends around the evolute circle over an angular range of less than 2Π such that a gap is formed in the inner reflective surface;
the curved mirror comprises a detector disposed in the gap in the inner reflective surface to detect light incident on the gap and provide a signal; and
a processor to determine a repetition rate of the optical delay line from the detector.

14. The optical delay line of claim 1, wherein the optical source is a pulsed optical source.

15. The optical delay line of claim 1, wherein the optical source is a laser source.

16. An optical delay line for use with an optical source comprising:
input/output optics optically coupled to the optical source to direct light from the optical source along a delay line beam path and to direct delayed light from the delay line beam path along an output beam path, the delay line beam path being tangent to an edge of a evolute circle of the optical delay line; and
a curved mirror with an outer reflective surface having a curvature based on an involute curve calculated from the evolute circle, the curved mirror being centered on an axis of the evolute circle to retro-reflect the light traveling along the delay line beam path,
wherein the curved mirror rotates about the axis of the evolute circle to controllably vary the delay of the optical delay line.

17. The optical delay line of claim 16, wherein:
the outer reflective surface of the curved mirror has a planar cross-sectional shape in a plane perpendicular to the evolute circle; and
the input/output optics comprise a beam splitter to i) couple the light from the optical source into the optical delay line along the axis of the evolute circle and ii) couple the delayed light out of the optical delay line along the output beam path.

18. The optical delay line of claim 16, wherein:
the outer reflective surface of the curved mirror has a chevron cross-sectional shape in a plane perpendicular to the evolute circle;
the input/output optics couple the light from the optical source along a first arm of the delay line beam path; and
the input/output optics couple the light from a second arm of the delay line beam path along the output beam path, the first arm of the delay line beam path being parallel to the second arm of the delay line beam path and offset in a direction parallel to the axis of the evolute circle.

19. The optical delay line of claim 16, wherein the input/output optics comprise converging optics to substantially compensate for a curvature of the outer reflective surface of the curved mirror in a plane parallel to the evolute circle.

20. The optical delay line of claim 16, wherein the outer reflective surface of the curved mirror comprises an integral number of substantially identical sections, N, the curvature of each substantially identical section based on the involute curve calculated from the evolute circle over a range of angles from $\theta_0$ to $\theta_0 2*\Pi/N$.

21. The optical delay line of claim 16, further comprising:
a controllable rotation stage coupled to the curved mirror; and
a processor electrically coupled to the controllable rotation stage to control a rotation speed of the controllable rotation stage, thereby controlling a rate of change of the delay of the optical delay line.

22. The optical delay line of claim 16, wherein:
the outer reflective surface of the curved mirror extends around the evolute circle over an angular range of less than 2Π such that a gap is formed in the outer reflective surface;
the curved mirror comprises a detector disposed in the gap in the outer reflective surface to detect light incident on the gap and provide a signal; and
a processor to determine a repetition rate of the optical delay line from the detector.

23. The optical delay line of claim 16, wherein the optical source is a pulsed optical source.

24. The optical delay line of claim 16, wherein the optical source is a laser source.

25. An optical delay line for use with an optical source comprising:
input/output optics optically coupled to the optical source to direct light from the optical source along a delay line beam path and to direct delayed light from the delay line beam path along an output beam path, the delay line beam path being tangent to an edge of an evolute curve of the optical delay line; and
a curved mirror with a reflective surface being centered about the evolute curve to retro-reflect the light traveling along the delay line beam path,
wherein at least one of the input/output optics and/or the curved mirror rotates about the evolute curve at a selected angular speed and the reflective surface has a curvature based on a parametric curve calculated from the evolute curve such that a delay of the optical delay line varies according to a predetermined function as the at least one of the input/output optics and/or the curved mirror is rotated.

26. The optical delay line of claim 25, wherein the predetermined function is a non-linear function of a rotation angle of the at least one of the input/output optics and/or the curved mirror.

27. An optical delay line for use with an optical source comprising:
- input/output means for directing light from the optical source along a delay line beam path and for directing delayed light from the delay line beam path along an output beam path, the delay line beam path being tangent to an edge of an evolute circle of the optical delay line; and
- mirror means with an inner reflective surface having a curvature based on an involute curve calculated from the evolute circle, and centered on an axis of the evolute circle to retro-reflect light traveling along the delay line beam path,
- wherein at least one of the input/output means and/or the mirror means rotates about the axis of the evolute circle to controllably vary the delay of the optical delay line.

28. An optical delay line for use with an optical source comprising:
- input/output means for directing light from the optical source along a delay line beam path and for directing delayed light from the delay line beam path along an output beam path, the delay line beam path being tangent to an edge of a evolute circle of the optical delay line; and
- mirror means with an outer reflective surface having a curvature based on an involute curve calculated from the evolute circle, and centered on an axis of the evolute circle to retro-reflect the light traveling along the delay line beam path,
- wherein the mirror means rotates about the axis of the evolute circle to controllably vary the delay of the optical delay line.

* * * * *